United States Patent [19]

Rogier et al.

[11] Patent Number: 4,609,723

[45] Date of Patent: Sep. 2, 1986

[54] POLYAMIDE FROM BIS(AMINOMETHYL)TRICYCLODECANE

[75] Inventors: Edgar R. Rogier, Minnetonka; H. Gordon Kanten, Minneapolis; Dwight E. Peerman, Minnetonka, all of Minn.

[73] Assignee: Henkel Corportion, Minneapolis, Minn.

[21] Appl. No.: 632,518

[22] Filed: Jul. 18, 1984

[51] Int. Cl.$^4$ .............................................. C08G 69/34
[52] U.S. Cl. ............................ 528/339.3; 260/404.5; 528/339.5; 528/344
[58] Field of Search .................... 260/404.5 PA; 528/339.3, 339.5, 344

[56] References Cited

U.S. PATENT DOCUMENTS 3,787,371  1/1974  Brinkmann et al. ................. 528/344

*Primary Examiner*—Harold D. Anderson
*Attorney, Agent, or Firm*—Ernest G. Szoke; Patrick J. Span

[57] ABSTRACT

Polyamide resins are disclosed of polymeric fat acids or certain dicarboxylic acids derived from a fatty acid and a bis(aminomethyl)tricyclodecane. Copolymerized acids or diamine or amino acids may be present. Because of the greater rigidity of some of the resins in addition to the other desirable properties of the polymeric fat acid polyamides, more application areas are opened such as the injection molded or extruded structural parts and components in addition to their utility as adhesives.

5 Claims, No Drawings

POLYAMIDE FROM BIS(AMINOMETHYL)TRICYCLODECANE

BACKGROUND OF THE INVENTION

This invention relates to polyamide compositions and more particularly to polyamides of bis(aminomethyl)-tricyclodecane and polymeric fat acids or certain dicarboxylic acids derived from a fatty acid. Further the invention relates to copolymer polyamide compositions in which other dibasic acids or esters, other diamines or other amide forming derivatives such as aminoacids are employed in part for the polymeric fat acid or the fatty dicarboxylic acid. Thus the polyamides may be homopolymers (a single dicarboxylic acid and single diamine) or copolymers employing additional acids, or amines as amide forming components.

The tricyclic polyamines, such as bis(aminomethyl)-tricyclodecane are known amines. U.S. Pat. No. 4,229,376 contains a discussion thereof including several end use applications. There is disclosed therein their utility as the preparation of polyamides, however, not with those of the present invention. Further U.S. Pat. No. 3,787,371, referred to in U.S. Pat. No. 4,229,376, and relates to preparation of crystal clear polyamides prepared from bis(aminomethyl)tricyclodecane and certain dicarboxylic acids, but not those of the present invention.

The polymeric fat acids have been known for some time as well as polyamides therefrom, but not however with the tricyclic amines of the present invention. As merely illustrative of some of these patents are U.S. Pat. No. 3,398,164 relating to polymeric fat acid polyamides of 1,4-bis(B-aminoethyl)benzene and Canadian Pat. No. 815,585 relating to polymeric fat acid polyamides of diamines such as 4,4'-diamino-3,3'-dimethyldicyclohexylmethane.

Dicarboxylic acids derived from fatty acids, and polyamides therefrom from amines other than those of the present invention are also known such as U.S. Pat. No. 3,937,688 relating to polyamide of hexamethylene diamine and U.S. Pat. No. 3,937,687 using a cyclic diamine such as bis(4-aminocyclohexyl)methane.

BRIEF SUMMARY OF THE INVENTION

It has now been discovered that polyamides of bis-(aminomethyl)tricyclodecane and a polymeric fat acid or a dicarboxylic acid derived from a fatty acid, have certain advantages over polyamides of such acids heretofore made. The use of this amine of this invention provides the capability of formulating a wide range of rigidity than heretofore possible with other commercially available amines and the acids of the present invention. Briefly the polyamide compositions of the present invention are prepared by reacting at amidification conditions 1,4-bis-(aminomethyl)tricyclodecane with the acids or mixtures thereof with other dibasic acids, amino acids, or other amide forming derivatives thereof. The time and temperature of the condensation or amidification reaction may be varied over a considerable range but is usually from 150–300° C. for a period of ½–8 hours, the longer period being employed at the lower temperatures. Essentially, one molar equivalent of amine is employed per molar equivalent of carboxyl group present.

DETAILED DESCRIPTION OF THE INVENTION

As indicated earlier this invention relates to polyamides of bis(aminomethyl)tricyclodecane and a polymeric fat acid or a dicarboxylic acid derived from a fatty acid.

The polymeric fat acids are well known and readily available commercially. One method of preparing such products is shown in U.S. Pat. No. 3,157,681. This patent also contains a general description of various other methods such as U.S. Pat. Nos. 2,347,562, 2,417,738, 2,426,489, 2,450,332, 2,673,184, 2,793,219, 2,793,220 and 2,955,121, which description is hereby incorporated by reference. Briefly the preferred method of preparing polymeric fat acids is by a process of polymerization consisting of heating unsaturated fatty acids (either an individual acid or mixtures thereof) derived from fats or oils at temperatures in the range of 180–200° C. in the presence of a clay catalyst. The usual temperature employed is 200–250° C. with about 230° C. being preferred.

As described in U.S. Pat. No. 3,398,164, earlier noted, the term "polymeric fat acids" as used herein is intended to be generic to polymerized acids obtained from "fat acids." The term "fat acids" is intended to include saturated, ethylenically unsaturated and synthetic, monobasic aliphatic acids containing from 8–24 carbon atoms.

The saturated, ethylenically unsaturated and acetylenically unsaturated fat acids are generally polymerized by somewhat different techniques, but because of the functional similarity of the polymerization products, they all are generally referred to as "polymeric fat acids."

Saturated fat acids are difficult to polymerize but polymerization can be obtained at elevated temperatures particularly in the presence of unsaturated acids with a peroxidic catalyst such a di-t-butyl peroxide. Because of the generally low yields of polymeric products, these materials are not currently commerically significant. Suitable saturated fat acids include branched and straight chain acids such as caprylic acid, pelargonic acid, capric acid, lauric acid, myristic acid, palmitic acid, isopalmitic acid, stearic acid, arachikic acid, behenic acid, and lignoceric acid.

The ethylenically unsaturated acids are much more readily polymerized. Catalytic or non-catalytic polymerization techniques can be employed. The non-catalytic polymerization techniques generally requires a higher temperature. Suitable catalysts for the polymerization include acid or alkaline clays, di-t-butyl peroxide, boron trifluoride and other Lewis acids, anthraquinone, sulfur dioxide and the like. Suitable monomers include the branched and straight chain, poly- and mono-ethylenically unsaturated acids such as 3-octenoic acid, 11-dodecanoic acid, linderic acid, lauroleic acid, myristoleic acid, tsuzuic acid, palmitoleic acid, gadoleic acid, cetoleic acid, nervonic acid, moroctic acid, timnodonic acid, eicosatetraenoic acid, nisinic acid, scoliodonic acid and chaulmoogric acid.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize. Therefore, they are not currently of commercial significance. Any acetylenically unsaturated fat acid, both straight chain and branched chain, both mono-unsaturated and poly-unsaturated, are useful monomers for the preparation of the polymeric fat acids. Suitable examples of such materials include 10-undecynoic acid, tariric acid, stearolic acid, behenolic acid and isamic acid.

As indicated, polymeric fat acids result from the polymerization of saturated, ethylenically unsaturated or acetylenically unsaturated naturally occurring or synthetic monocarboxylic aliphatic acids containing from 8 to 24 carbon atoms. The preferred monocarboxylic acids from which polymeric fat acids are prepared are those containing about 16 to 20 carbon atoms and commercially the 18 carbon atom monocarboxylic acids such as oleic, linoleic, linolenic, and eleostearic acids are employed as starting materials for the preparation of the polymeric fat acids. A mixture of acids, tall oil fatty acids, (predominately a mixture of oleic and linoleic acids) is the most common starting material.

After polymerization, with or without a catalyst, the resulting product is a mixture of predominantly dimeric fat acids, some trimeric and higher polymeric fat acids and some unpolymerized monomeric fat acids. Typical commercially available polymeric fat acids based on $C_{18}$ unsaturated acids, i.e. tall oil fatty acids, will have a dimeric fat acid content of about 60 to 80% by weight, a trimeric and higher polymeric fat acid content of about 10 to 35%, and a monomeric fat acid content of about 5 to 20% by weight. The polymeric fat acids may be fractionated to provide products having higher dimer contents, by conventional distillation, or solvent extraction techniques may be employed therefor. They may also be hydrogenated (before or after distillation) to reduce unsaturation, under hydrogen pressure in the presence of a hydrogenation catalyst, as illustrated in U.S Pat. No. 3,256,304. It is also understood that such other derivatives of polymeric fat acids which are capable of forming amides in reaction with a diamine, such as the lower alcohol (1 to 8 carbon atoms) esters of polymeric fat acids may be employed in place of the acids themselves in which the by-product is then a lower alcohol rather than water.

Reference has been made above to the monomeric, dimeric and trimeric fat acids present in the polymeric fat acids. The amounts of monomeric fat acids, often referred to as monomer (M), dimeric fat acids, often referred to as dimer (D), and trimeric or higher polymeric forms, often referred to as trimer (T), may be determined by gas liquid chromatography (GLC) of the methyl esters of the polymeric fat acids. In this method of analysis, an intermediate (I) is seen between the monomer and dimer forms. It is desirable that this intermediate be low, but polymeric fat acids generally having less than 10%, and preferably less than 6% intermediate by weight are satisfactory. Unless otherwise indicated, this analytical method was employed in the analysis of the polymeric fat acids employed in this invention.

For the purpose of this invention it is preferable that the dimeric fat acid content be 80% by weight or higher, with the higher amounts, above 90% being preferred.

The preparation of dicarboxylic acids derived from a fatty acid are described in Rogier et al U.S. Pat. Nos. 3,937,687 and 3,937,688, which are incorporated herein by reference. As described therein the dicarboxylic acid is prepared by reacting an unsaturated fatty acid with carbon monoxide and water as described in Reppe and Kroper, Ann. 582, 63-65 (1953) or to react the carbon monoxide and unsaturated acid in the presence of hydrogen to provide the aldehyde or alcohol which are then oxidized to the acid. The preferred starting material is an unsaturated fatty acid such as oleic acid which is readily available commercially. With such acid, the resulting product is a $C_{19}$ dibasic acid, commonly referred to as heptadecane dicarboxylic acid, usually employed in the form of the mixture of isomers as a result of the method of preparation. The $C_{19}$ product might also be regarded as a stearic acid substituted with a carboxy group along the fatty chain predominantly at the 9 and 10 carbon atoms of the stearic acid.

The diamine employed in the present invention is bis(aminomethyl)tricyclodecane, which can be represented by the formula:

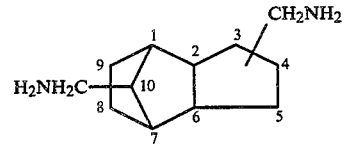

and will be referred to herein as BAMTCD. The product employed is predominantly the diamine having the $CH_2NH_2$ groups in the 3 and 8 positions with some at the (4) or (5) positions so that the compound is designated as the 3(4)(5), 8-bis(aminomethyl) tricyclodecane.

Co-polymerizing or co-reacting dibasic acids (or their esters) employed in the preparation of the copolyamides of the present invention are selected from compounds having the formula:

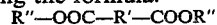

where R' is an aliphatic hydrocarbon radical, either straight or branched chain, having from 1 to 20 carbon atoms, an alicyclic or aliphatic substituted alicyclic hydrocarbon radical having from 6 to 20 carbon atoms, an aromatic or an aliphatic substituted aromatic radical having from 6 to 20 carbon atoms and R" is hydrogen or an alkyl group having from 1 to 8 carbon atoms. In general, R' is a divalent alkylene radical having from 2 to 12 carbon atoms. Such acids are illustrated by oxalic, malonic, adipic, pimelic, suberic, azelaic, sebacic, dodecanedioc, succinic, glutaric acids and the like. Illustrative of the aromatic acids are terephthalic, isophthalic, naphthalene dicarboxylic acids, and the like.

Illustrative of alicyclic dicarboxylic acids are 1,4- or 1,3- cyclohexane dicarboxylic acid. R" is generally an alkyl group such as methyl, ethyl, propyl, butyl or octyl. It is understood that other amide forming derivatives of said carboxylic acids may also be used, such as amides, nitriles, and acid chlorides.

Co-polymerizing diamines generally employed may be aliphatic, cycloaliphatic or aromatic diprimary diamines which may be represented by the formula:
$$H_2N-R-NH_2$$

where R is an aliphatic, cycloaliphatic or aromatic hydrocarbon radical containing from 2-20 carbon atoms. Representative of such compounds are:
ethylene diamine
1,2-diamino propane
1,2-diamino butane
1,3-diamino propane
1,3-diamino butane
tetramethylene diamine
pentamethylene diamine
hexamethylene diamine
decamethylene diamine
dodecamethylene diamine
metaxylylene diamine
paraxylylene diamine
cyclohexylene diamine
bis(aminoethyl) benzene
cyclohexyl bis(methyl amine)
diamino-dicyclohexyl methane
methylene dianiline
The diamine may be employed alone or mixtures of two or more may be employed. The preferred diamines are alkylene diamines in which the alkylene group contains from 2-6 carbon atoms.

Where desired, in place of the dibasic acids or the esters therof, or copolymerizing diamines, as set forth alone, amino acids or their corresponding lactams may be employed. Such amino acids may be represented by the formula:
$$H_2N(CH_2)xCOOR''$$

where x is an interger from 2 to 15, and R" is as defined above. The corresponding lactams may be represented by the formula $$\overline{HN\,(CH_2)_x\,CO}$$

where x is as defined above. In general, the most common amino acids or the corresponding lactams employed are amino-caproic acid (or epsilon -caprolactam), amino-undecanoic acid and omega-capryllactam, where x is 5, 10, and 7 respectively.

Considerable variation is possible in the relative proportions of the reactants employed depending upon the particular set of properties desired in the resin. In the homopolymer compositions there are of course no co-polymerizing acids or amines and essentially one molar equivalent of amine is employed per molar equivalent of acid. Mixtures of the polymeric fat acid and the dicarboxylic fatty acid may be employed in which one of the acids is deemed a copolymerizing acid in respect to the other, i.e. the heptadecane dicarboxylic acid would be a copolymerizing acid with respect to the polymeric fat acid particularly where the polymeric fat acid accounts for the major amount of the acid component.

Where copolymerizing acids and/or amines are present with the polymeric fat acid composition the carboxyl groups attributable to the polymeric fat acids desirably account for in excess of 20, but more desirably in excess of 50 equivalent percent of the acid component, the total carboxyl groups present, and preferably in excess of 60 equivalent percent thereof, the remainder being attributable to the copolymerizing dibasic acid or any amino acid employed. Similarly in polyamides of the heptadecane dicarboxylic acid, employing copolymerizing acids the heptadecane dicarboxylic acid should desirably account for in excess of 50 equivalent percent of the acid component. In the amine component the tricyclodecane diamine should desirably account for at least 40 equivalent percent of the total amine groups present in the amine component, and preferably in excess of 50 equivalent percent the remainder being attributable to the copolymerizing diamine or amino acid present.

As indicated earlier, the use of the bis(aminomethyl)-tricyclodecane diamines with the polymeric fat acid, or dicarboxylic acid derived from an unsaturated fatty acid, provides a combination of properties having a wide range making the products useful in a greater degree of applications than thought possible earlier. This is particularly applicable in formulating the products with co-diamines or co-dibasic acids. Using coacids with dimeric fat acid results in copolyamides of high modulus and good physical properties. By using coamines with BAMTCD and dimeric fat acids, copolyamides of good physical properties and low modulus are provided. Thus a wide range of rigidity can be achieved by using this amine. Wider range of moduli can be achieved with this amine than with other amines or system of coamines using dimeric fat acids. This in turn allows one to formulate low modulus polyamides for bonding flexible substrates or to formulate highly rigid yet tough polyamides for bonding rigid substrates or for structural molding compounds. This diamine provides opportunities for dimer acid based polyamides, with their historic strong points, into potential applications which demand greater rigidity than heretofore possible, such as injection molded or extruded structural elements.

The mechanical properties of direct interest in the compositions of the present invention are tensile strength and elongation. These properties are measured on an Instron Tensile Tester Model TTC using ASTM D-1708-59T.

The polymer is compression molded as a 6"×6" sheet of approximately 0.04 inch thickness, at a temperature near its melting point (usually a few degrees lower than the melting point) and at 40,000 lbs load or higher using cellophane as the parting agent in the mold. From this sheet, test specimens are die-cut to conform to ASTM 1708-59T.

The test specimen is clamped in the jaws of the Instron. Crosshead speed is usually 0.5 inch/minute at 100 pound full scale load. Chart speed is 0.5 inch/minute. Tensile strength (reference: ASTM D-638-52T) is calculated as:

$$\text{Tensile strength} = \frac{\text{maximum load in pounds}}{\text{cross sectional area (sq. in.)}}$$

Percent elongation is calculated as:

Percent elongation =

$$\frac{(\text{gauge length at break}) - (\text{gauge length at 0 load})}{\text{gauge length at 0 load}} \times 100$$

In addition to tensile strength and elongation, the following properties were measured on most of the polymers prepared:
 (1) Ball and ring softening point-ASTM E28-59T.
 (2) Amine and acid end groups-conventional analytical titration procedures. The results are expressed in terms of milliequivalents of acid or amine per kilogram of product (meq./keg.)
 (3) Tensile modulus-as defined in ASTM d638-60T.

The following examples will serve to further illustrate the invention in which all parts and percentages are by weight unless otherwise indicated.

EXAMPLE A

Polyamide Preparation Procedure

Into a stainless steel pressure reactor are weighed all of the raw materials to prepare the polyamide. The reactants are stirred efficiently while being heated in a closed system until the water of condensation causes the pressure to rise to 100 psi (180–190° C.). It is maintained at these conditions for 90 minutes and then steam is released slowly while heating to 250° C. at which time the pressure has returned to atmospheric. The reactants are maintained at 250° C. for 3 to 4 hours, the last 2 to 3 hours at approximately 1mm Hg vacuum. Vacuum is broken with nitrogen, the reactants are sometimes cooled slightly, and the product is discharged from the reactor and cooled rapidly. This method was used in the preparation of the polyamides of the following examples.

EXAMPLE 1–10

Following procedure A above, ten polyamide resins were prepared, employing reactants and amounts as set forth in Table I which follows.

The examples 1–10 used a commercially available BAMTCD obtained from Hoechst, made in Germany, and having an equivalent weight of 97.4. Polymeric fat acids from tall oil fatty acids having the analysis indicated were used in Examples 1–4, 6–8, and 10. Heptadecanedicarboxylic acid was used in Examples 5 and 9. Coamines were used in Examples 3–5, 7 and 8 and coacids were used in Examples 2, 6, and 10 (ester). The properties of these polyamides are shown in Table II. These illustrate the wide range of softening points and moduli possible in BAMTCD-based polyamides. Several of these experimental polymers have very good strength properties which are useful in molded mechanical parts or as thermoplastic adhesives.

TABLE I

COMPOSITION OF POLYAMIDES PREPARED FROM BAMTCD

| Ex. No. | AMINE #1 | | ACID #1 | | AMINE #2 | | ACID #2 | | STEARIC ACID MONOMER |
|---|---|---|---|---|---|---|---|---|---|
| | | Equiv(g.) | | Equiv(g.) | | Equiv(g.) | | Equiv(g.) | Equiv(g.) |
| 1 | BAMTCD | 2.041(200) | HDD* | 2.000(570) | | | | | |
| 2 | BAMTCD | 2.316(227) | HDD* | 1.200(342) | | | Azelaic | 1.074(101) | .025(7) |
| 3 | BAMTCD | 0.952(94) | HDD* | 2.000(570) | HMDA | 1.084(63) | | | .042(12) |
| 4 | BAMTCD | 0.980(96) | HDD* | 1.958(558) | MXDA | 1.059(72) | | | .042(12) |
| 5 | BAMTCD | 1.408(138) | $C_{17}(COOH)_2$**** | 3.000(498) | HMDA | 1.652(96) | | | |
| 6 | BAMTCD | 2.781(272.5) | HDD* | 0.639(182) | | | Azelaic | 2.069(194.5) | .019(5.4) |
| 7 | BAMTCD | 0.674(66) | HDD* | 1.726(492) | HMDA | 1.130(65.6) | | | .039(11) |
| 8 | BAMTCD | 1.031(101) | HDD* | 1.712(488) | HMDA | 0.775(45) | | | .053(15) |
| 9 | BAMTCD | 2.48(243) | $C_{17}(COOH)_2$*** | 2.361(392) | | | | | .028(8) |
| 10 | BAMTCD | 1.50(147) | HDD** | 0.474(135) | | | DMI | 1.062(103) | |

HDD Hydrogenated and distilled polymeric fat acids from tall oil acids
*M = 2.3, I = 3.5, D = 91.0, T = 3.2
Sap. value 196.8
Eq Wt = 285
**M = 0.9, I = 2.3, D = 93.6, T = 3.2
Eq Wt = 285
***Heptadecane dicarboxylic (BASF)
****Heptadecane dicarboxylic acid (BASF) - Eq. Wt = 166
HMDA Hexamethylene Diamine
MXDA Metaxylylene Diamine
DMI Dimethyl isophthalate

TABLE II

PROPERTIES OF POLYAMIDES PREPARED FROM BAMTCD

| Ex. No. | B & R MP, °C. | Acid Meq/kg | Amine Meq/kg | Viscosity | | Tensile, Psi | | Elongation | | Modulus psi |
|---|---|---|---|---|---|---|---|---|---|---|
| | | | | p. | Temp. | Yield | Ultimate | % | (1 day) | (30 days) |
| 1 | 187 | 7 | 89 | 2900 | 205 | 3640 | 3940 | 260 | 108,000 | 88,000 |
| 2 | 161 | 21 | 81 | 950 | 220 | 6460 | 5150 | 210 | 133,000 | 139,000 |
| 3 | 135 | 15 | 60 | 510 | 205 | 270 | 4960 | 570 | 780 | 10,000 |
| 4 | 144 | 12 | 28 | 700 | 205 | 370 | 3670 | 430 | 5,350 | 6,450 |
| 5 | 175 | 31 | 33 | 1500 | 225 | 5740 | 5330 | 320 | 5,230 | 107,000 |
| 6 | 180 | 13 | 107 | 1300 | 230 | 7690 | 3590 | 80 | 7,140 | 164,000 |

TABLE II-continued
PROPERTIES OF POLYAMIDES PREPARED FROM BAMTCD

| Ex. No. | B & R MP, °C. | Acid Meq/kg | Amine Meq/kg | Viscosity p. | Viscosity Temp. | Tensile, Psi Yield | Tensile, Psi Ultimate | Elongation % | Elongation (1 day) | Modulus psi (30 days) |
|---|---|---|---|---|---|---|---|---|---|---|
| 7 | 135 | 11 | 65 | 375 | 205 | 180 | 2540 | 540 | 20 | 4,400 |
| 8 | 116 | 10 | 92 | 75 | 205 | 140 | 2790 | 480 | 40 | 1,400 |
| 9 | 157 | 18 | 148 | 600 | 190 | — | — | — | * | * |
| 10 | 165 | 213 | 150 | 875 | 205 | — | — | — | * | * |

*Tensile properties not measured on these polyamides because of brittle nature.

EXAMPLE 11

In this example the BAMTCD amine had an equivalent weight of 97.1 and was reacted with a hydrogenated and distilled polymerized tall oil fatty acid (HDD) having the following analysis

| Sap. Value | 196.8 |
|---|---|
| % M | 2.3 |
| % I | 3.5 |
| % D | 91.0 |
| % T | 3.2 |

Stearic acid was added to the polymeric fat acid so as to raise the monomeric content to 4.0% and reducing the trimer content to 3.1%. The materials employed were as follows:

| Material | Eq. Wt. | Equivs. | Grams |
|---|---|---|---|
| HDD | 285 | 0.393 | 112.0 |
| Stearic acid | 285 | 0.007 | 2.0 |
| BAMTCD | 97.1 | 0.404 | 39.2 |

The materials were heated and stirred slowly to 250° C. while the majority of the condensate was evolved. Thereafter it was heated under nitrogen at 250° C. for one hour followed by a vacuum of 3 mm for three hours. The product was discharged and allowed to cool rapidly. The resulting tough polyamide was nearly water white. The properties of the polyamide were:
B&R MP=136° C.
Melt Index (175° C.)=75
Hot Bar Fusion Point=103° C.
Tensile Strength at yield=3500 psi
Tensile Strength at break=3400 psi
Elongation at break=260%
2% Secant Modulus, 1 day=85,900 psi
2% Secant Modulus, 30 days=104,000 psi
Water absorption, immersion, 24 hrs=0.15%
Acid=30 meq/kg
Amine=48 meq/kg
Inh. Visc.=0.297

We claim:

1. A polyamide comprising the amidification product of bis(aminoethyl)tricyclodecane and a dicarboxylic acid derived from a monomeric, unsaturated fatty acid containing from 8 to 24 carbon atoms.

2. A polyamide as defined in claim 1 wherein said dicarboxylic acid derived from a monomeric unsaturated fatty acid is heptadecane dicarboxylic acid.

3. A polyamide as defined in claim 1 wherein said dicarboxylic acid is a dimeric fat acid.

4. A polyamide as defined in claim 3 wherein said dimeric fat acid is a polymerized $C_{18}$ monocarboxylic acid fatty acid.

5. A polyamide as defined in claim 3 wherein said dimeric fat acid is polymerized tall oil fatty acids.

* * * * *